United States Patent [19]

Kessler

[11] 4,434,250

[45] Feb. 28, 1984

[54] POROUS TUBING

[75] Inventor: Erich Kessler, Hoechst, Fed. Rep. of Germany

[73] Assignee: Akzo N.V., Arnhem, Netherlands

[21] Appl. No.: 335,393

[22] Filed: Dec. 29, 1981

[30] Foreign Application Priority Data

Dec. 31, 1980 [DE] Fed. Rep. of Germany ....... 3049557

[51] Int. Cl.$^3$ .......................... B29D 27/00; B29F 3/04
[52] U.S. Cl. ........................................ 521/64; 264/41; 264/209.1; 425/67; 425/817 C; 521/143; 521/184
[58] Field of Search ................... 264/41, 209.1, 209.5, 264/54, 49; 521/64, 142, 143, 184; 425/67, 817 C

[56] References Cited

U.S. PATENT DOCUMENTS

| | | | |
|---|---|---|---|
| 3,121,760 | 2/1964 | Kline | 264/209.5 X |
| 3,512,997 | 5/1970 | Cohly et al. | 264/54 |
| 3,686,377 | 8/1972 | Hays | 264/209.1 X |
| 3,691,068 | 9/1972 | Cross | 264/41 X |
| 3,724,672 | 4/1973 | Leonard et al. | 264/41 X |
| 3,745,202 | 7/1973 | Riggleman et al. | 264/41 |
| 3,799,356 | 3/1974 | Salyer | 264/41 X |
| 3,851,025 | 11/1974 | Ram | 264/41 |
| 3,864,444 | 2/1975 | Johnson | 264/209.1 X |
| 4,164,437 | 8/1979 | Henne et al. | 264/41 X |
| 4,181,694 | 1/1980 | Hashino et al. | 264/41 |
| 4,247,498 | 1/1981 | Castro | 264/41 |
| 4,332,752 | 6/1982 | Henne et al. | 264/41 |

FOREIGN PATENT DOCUMENTS 2737745 3/1978 Fed. Rep. of Germany .
2737734 12/1978 Fed. Rep. of Germany .
2833493 2/1980 Fed. Rep. of Germany .

Primary Examiner—Philip E. Anderson
Attorney, Agent, or Firm—Michael J. Striker

[57] ABSTRACT

Method and apparatus for the production of porous tubing. One extrudes a homogeneous mixture of at least two components, one component a meltable polymer and the other component a liquid inert in relation to the polymer, both components forming a binary system which in liquid aggregate state displays a range of complete miscibility and a range with a miscibility gap, at a temperature above the separation temperature, substantially vertically upwardly using a circular slot nozzle and blowing of gas or dosing-in of liquid into the interior of the nozzle, into a bath, which displays a temperature below the separation temperature, allows the tubing to solidify, and extracts or lixiviates the tubing. Preferred embodiments include the use of water at a temperature from 15° to 90° C. as bath liquid; use of polypropylene as the polymer and N,N-bis-(2-hydroxyethyl)-hexadecylamine as liquid; blowing nitrogen gas into the interior of the nozzle; lixiviating with alcohol; thermally insulating the circular slot nozzle from the bath; having a non-insulated zone between the circular slot and the thermal insulation; the non-insulated zone of the nozzle having a breadth of about 0.5 to 1 mm; using thermal insulation based upon asbestos cement. The apparatus for the production of the porous tubing by extrusion of such homogeneous mixture contains a circular slot nozzle, having a circular slot and provided with means thermally insulating in relation to the bath liquid, displaying a zone without thermal insulation between said circular slot and said thermally means.

19 Claims, 2 Drawing Figures

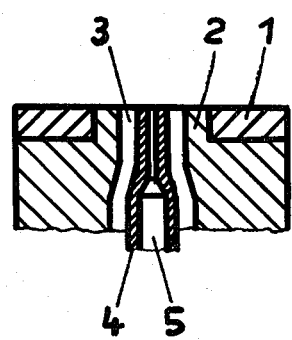

POROUS TUBING

BACKGROUND OF THE INVENTION

The invention concerns an apparatus and a method for the production of porous or microporous tubing, through extrusion of a homogeneous mixture of a polymer and a liquid into a bath.

In German Offenlegungsschrift DE-OS No. 2 737 745 a series of microporous polymer structures and a method for their production are described. The structures display an excellent porous or microporous structure in the interior of the formed bodies, such as films or blocks, and possess valuable characteristics. Indications to work up such polymer-liquid systems into tubing are not however found in this reference. If one attempts in customary manner to produce tubing through extrusion, satisfactory results are not attained. There occur problems with regard to uniformity of wall thickness. Moreover, the desired microporous structures are not obtained. Also, irregularities in the surfaces can be noted. Finally, the tubings often tend to collapse.

In German Offenlegungsschrift De-OS No. 2 833 493 methods for the production of porous hollow filaments from polymer-liquid-combinations are described, such as those combinations disclosed in German Offenlegungsschrift DE-OS No. 2 737 734. The methods described in DE-OS No. 2 833, 493 do not however carry over to the production of tubing.

SUMMARY OF THE INVENTION

There exists therefore a need for a method and an apparatus, with which porous tubing or microporous tubing without the above outlined disadvantages can be produced. It is therefore an object of the present invention to provide a method with which it is possible to produce porous or microporous tubing, which over a uniform wall thickness displays a microporous or porous interior structure, possessing an interior wall surface and an outer wall surface, which to desired extents is permeable for liquids and gases, and which outer wall surface if necessary displays a different degree of openings, compared to the inner wall surface.

This object is attained according to the present invention by a method for the production of porous tubings, wherein one extrudes a homogeneous mixture of at least two components, one component a meltable polymer and the other component a liquid inert in relation to the polymer, both components forming a binary system, which in liquid aggregate state displays a range of complete miscibility and a range with a miscibility gap, at a temperature above the separation temperature, substantially vertically from below to above, using a circular or ring slot nozzle or annular die nozzle and blowing in of gas or dosing of liquid into the interior of the nozzle, into a liquid bath, which displays a temperature below the separation temperature, and allows the tube to solidify, and then lixiviates the tubing.

Water at a temperature from about 15° to 90° C. is very suitable for the bath. A suitable polymer/inert liquid combination is polypropylene and N,N-bis-(2-hydroxyethyl)-hexadecylamine.

Nitrogen can be used as gas for introduction into the interior of the nozzle. Alcohol, in particular ethyl alcohol, is very suitable for the extraction of the tubing.

Preferably, a ring slot nozzle is used for the extrusion, which is thermally insulated in relation to the bath liquid. Therewith it is expedient to provide, between ring nozzle and thermal insulation, a non-insulated zone. The non-insulated zone displays preferably a breadth from about 0.5 to 1 mm.

It is particularly suitable to use a substance based upon asbestos cement as the material for the thermal insulation.

For production of the porous tubing through extrusion, a homogeneous mixture of a meltable polymer and a liquid inert in relation to the polymer, substantially vertically from below to above into a liquid bath, a ring slot nozzle can serve, which is thereby characterized in that it is provided with a thermal insulation in relation to the bath liquid, and displays between ring nozzle and thermal insulation a zone without thermal insulation.

For the production of porous or microporous tubing according to the present invention, an apparatus can serve as more closely illustrated below. The apparatus is composed substantially of a heatable vessel, which serves for production of the homogeneous mixture or solution of the meltable polymer and the inert liquid. In this vessel both of the components are heated to a temperature above the separation temperature, so that a single-phase mixture arises. If necessary, the dissolving is undertaken under a protective gas atmosphere, e.g. under nitrogen. An evacuation in order to remove any possibly dissolved gas can be appropriate.

The porosity, i.e. the portion of cavity volume in the tubing, can be increased depending upon the portion of inert liquid used. Preferably, the portion of inert liquid amounts to between about 50 and 90% by weight.

The homogeneous mixture is then led across a dosage pump into a ring slot nozzle, such as that outlined in the drawing.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a schematic cross-section through a circular slot nozzle according to the present invention.

FIG. 2 is a flow diagram illustrating schematically the method according to the present invention.

DESCRIPTION OF THE PREFERRED EMBODIMENTS

In the FIGURE, reference numeral 1 is a coating, which serves for thermal insulation of the nozzle from the bath liquid. Reference numeral 2 identifies the partial section of the nozzle material which is not insulated and comes directly into contact with the bath liquid. Reference numeral 3 is the ring slot, through which the homogeneous mixture is extruded into the bath liquid, which is located above the nozzle. Reference numeral 4 represents a feed pipe for the gas or the dosed-in liquid, which is led through the interior of the nozzle into the interior of the extruded tubing. Reference numeral 5 is the opening in the feed pipe 4 for passage of the gas or the liquid.

The homogeneous solution is extruded substantially vertically from below to above into the liquid bath using the ring slot nozzle. The bath which is present above the nozzle is not illustrated in the FIGURE.

The nozzle can be placed directly into the liquid bath; it is also possible to place the nozzle, for example, into a cylindrical vessel, which contains the bath liquid.

The numerals in FIG. 2 represent:

6 steel kettle
7 stirrer
8 pump
9 conduit
10 nozzle
11 needle nozzle
12 thermostat
13 glass cylinder
14 overflow funnel
15 offtake roller
16 perforated drum.

Through choice of bath liquid, and adjustment of the temperature of the bath, it is possible to influence the structure of the outer wall surface of the porous tubing. One thus obtains, by way of example, through the use of water as the bath liquid, polypropylene and N,N-bis-(2-hydroxyethyl)-hexadecylamine as binary system, and dosing of nitrogen at room temperature through the interior of the tubing, tubing which displays a reduced degree of openings in the outer wall surface, relative to the interior wall surface. That is, the open surface in the outer wall of the tubing is less than that in the interior of the tubing. This can e.g. thereby give rise to a substantially greater number of open pores in the interior of the tubing than in the outer wall surface.

When using a bath which also contains some of the inert liquid, which is present in the extruded binary system, the number of open pores in the outer wall surface can be increased. Conversely, one can considerably decrease the number of open pores through dosing-in of a liquid, e.g. water, into the interior of the nozzle.

After leaving the nozzle, the tubing is separated substantially vertically upwardly through the bath liquid, and across suitable rollers for further working up. The bath can be thermostatically controlled and e.g. according to the principle of the overflow vessel and dosing-in of fresh bath liquid, held to constant conditions.

The soldified tubing is then lixiviated (or extracted), whereby for example alcohol or acetone can serve as extraction liquid.

According to the present invention, multiple combinations of meltable polymer and inert liquid can be worked up into tubing. Suitable systems are described in German Offenlegungsschrift No. DE-OS 2 737 745. The mixture of polypropylene and N,N-bis-(2-hydroxyethyl)-hexadecylamine is particularly suitable. Also, polyamides, e.g. Polyamid 6, in combination with a suitable liquid, can be worked up well into tubing according to the present invention.

It is of significance for the bath liquid to be capable of a sufficient removal of heat from the extruded solution, i.e. the heat conductivity of the bath should be sufficiently high.

According to the invention, tubing can be produced with different wall thicknesses and outer diameters. Suitable wall thicknesses are e.g. 0.5 to 2.5 mm, preferably 1 to 1.5 mm; suitable outer diameters are e.g. 2.5 to 25 mm, preferably 7 to 12 mm.

According to the invention, tubing can be produced which is provided with a very uniform structure. The degree of porosity can be adjusted to the extent desired, and reproducibly, by selecting an appropriate ratio of inert liquid to polymer. It is thus possible without more to produce tubing which possesses a porosity of more than 50%, e.g. 70–80%, indeed even 90%.

Since one can produce tubing according to the present invention which on the one hand is provided with a constant structure and a large interior cavity volume, and on the other hand can display differences in the surface structures, the tubings according to the present invention have versatile utility. They can in particular be used where the main point is that liquids or gases, e.g., are supposed to be delivered outwardly with as constant as possible uniform velocity. The tubing according to the present invention can also be used for separation operations.

The invention is more closely illustrated through the following example.

EXAMPLE 6,750 g (75% by weight) N,N-bis-2-hydroxyethyl-hexadecylamine and 2,250 g (25% by weight) polypropylene, of constitution Typ PPH 1 050, melt index 1.5, (Hoechst AG) are heated to 235° C. in a 15-liter steel kettle 6, under stirring with stirrer 7 in a vacuum from 20–50 Torr, then stirred for 2 hours, until a homogeneous melt is produced. Thereafter the stirring is cut off and the container is given a nitrogen pressure from 1 to 2 bar.

The entire apparatus is heated so that the temperature decreases, from kettle to nozzle, from 220° C. to 200° C.

Through connection of a geared pump 8 the melt is conveyed through a conduit 9 into a nozzle 10, as illustrated schematically in the drwing, pressed through and formed into a tubing. Through the center of the tubing nitrogen is led through a pin-type nozzle on needle nozzle 11, and the hollow space of the tubing is thereby adjusted according to the amount of nitrogen.

Upon exit from the nozzle of the melt, water, the temperature of which is adjusted by means of a thermostat 12, is pumped into a glass cylinder 13 screwed in perpendicular to the nozzle. The water is re-cycled into the thermostat over an overflow funnel 14 at the upper end of the cylinder. The water temperature can amount to from 15° to 90° C. Since the density of the melt is less than that of the water, and nitrogen will be blown into the interior of the tubing, it floats to the surface of the water. It is there received and laid upon an offtake roller 15, and then put away in a rotating, perforated drum 16.

So that no nitrogen can escape from the tubing, it is at the start squeezed off with a clamp. The dimension of the tubing can be determined according to the nozzle dimension, the melt throughput (i.e. weight rate of flow), the amount of nitrogen and the take-off velocity.

The extraction of the tubing follows in the perforated drum with ethanol at 40°–50° C. Therewith also ethanol is pumped through the tubing interior an the tubing is alternately blown through with air at 2 bar.

It will be understood that each of the elements described above, or two or more together, may also find a useful application in other types of tubing differing from the types described above.

While the invention has been illustrated and described as embodied in porous tubing and a method for its production, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. Method for the production of porous tubing, comprising extruding a homogeneous mixture of at least two components, one component a thermoplastic meltable polymer and the other component a liquid inert in relation to the polymer, both components forming a binary system which in liquid aggregate state displays a range of complete miscibility and a range with a miscibility gap, at a temperature above the separation temperature, substantially vertically upwardly without horizontal expansion using a annular slot nozzle and blowing of gas or dosing-in of liquid into the interior of the nozzle, into a bath of a cooling medium, the temperature of said bath being below the separation temperature of the homogeneous mixture, allowing the tubing to solidify, and lixiviating the liquid of the tubing.

2. Method according to claim 1, wherein said bath is water at a temperature from about 15° to 90° C.

3. Method according to claim 1, wherein said polymer is polypropylene and said liquid inert in relation to said polymer is N,N-bis-(2-hydroxyethyl)-hexadecylamine.

4. Method according to claim 1, wherein nitrogen gas is blown into the interior of the nozzle.

5. Method according to claim 1, wherein said lixiviating is performed with alcohol.

6. Method according to claim 1, wherein said circular slot nozzle is thermally insulated from said bath by thermal insulating means.

7. Method according to claim 6, wherein said circular slot nozzle has a non-insulated section between the circular slot and the thermal insulating means.

8. Method according to claim 7, wherein said non-insulated section of said nozzle has a breadth of about 0.5 to 1 mm.

9. Method according to claim 6, wherein said thermal insulating means of said circular slot nozzle is based upon asbestos cement.

10. Method according to claim 1, wherein said liquid inert in relation to said polymer amounts to between about 50 and 90% by weight of said homogeneous mixture.

11. Method according to claim 1, wherein dimensions of said nozzle are so selected that said porous tubing is produced with a wall thickness between about 0.5 and 2.5 mm and an outer diameter between about 2.5 and 25 mm.

12. Method according to claim 11, wherein dimensions of said nozzle are so selected that said tubing is produced with a wall thickness between about 1 and 1.5 mm and an outer diameter between about 7 and 12 mm.

13. Method according to claim 1, wherein an appropriate ratio of inert liquid to polymer in said homogeneous mixture is selected so that said tubing has a porosity of more than 50%.

14. Method according to claim 13, wherein an appropriate ratio of inert liquid to polymer in said homogeneous mixture is selected so that said porosity is from 70 to 80%.

15. Porous polymer tubing produced by the method according to claim 1, having a wall thickness between about 0.5 and 2.5 mm and an outer diameter between about 2.5 and 25 mm.

16. Porous polymer tubing according to claim 15, wherein said wall thickness is between about 1 and 1.5 mm and said outer diameter is between about 7 and 12 mm.

17. Porous polymer tubing according to claim 15, having a porosity of more than 50%.

18. Porous polymer tubing according to claim 17, wherein said porosity is from 70 to 80%.

19. Apparatus for the production of porous tubing by extrusion of a homogeneous mixture of a meltable polymer and a liquid inert in relation to the polymer, substantially vertically upwardly into a liquid bath, comprising a circular slot nozzle, having a circular slot and provided with means thermally insulating in relation to said bath liquid, said nozzle having a section without thermal insulation between said circular slot and said thermally insulating means.

* * * * *